US012160516B2

(12) United States Patent
Ngo et al.

(10) Patent No.: US 12,160,516 B2
(45) Date of Patent: Dec. 3, 2024

(54) TECHNIQUES FOR SECURELY PERFORMING OFFLINE AUTHENTICATION

(71) Applicant: Visa International Service Association, San Francisco, CA (US)

(72) Inventors: Hao Ngo, San Jose, CA (US); Yuexi Chen, Foster City, CA (US); Thomas Bellenger, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/684,425

(22) Filed: Mar. 2, 2022

(65) Prior Publication Data

US 2022/0393874 A1 Dec. 8, 2022

Related U.S. Application Data

(63) Continuation of application No. 16/226,583, filed on Dec. 19, 2018, now Pat. No. 11,303,450.

(51) Int. Cl.
*H04L 9/32* (2006.01)
*G06F 21/36* (2013.01)
*H04L 9/30* (2006.01)

(52) U.S. Cl.
CPC ............ *H04L 9/3226* (2013.01); *G06F 21/36* (2013.01); *H04L 9/30* (2013.01); *H04L 9/3252* (2013.01);
(Continued)

(58) Field of Classification Search
CPC ... H04L 9/3226; H04L 9/3268; H04L 9/3297; H04L 9/30; H04L 9/3252; H04L 9/3263;
(Continued)

(56) References Cited

U.S. PATENT DOCUMENTS 9,299,203 B2 * 3/2016 Borucki ................... G06K 1/00
10,366,378 B1 * 7/2019 Han ..................... G06Q 20/204
(Continued)

FOREIGN PATENT DOCUMENTS

CN 106452756 2/2017
ES 2671196 A1 * 6/2018 ......... H04L 63/0492
(Continued)

OTHER PUBLICATIONS

R. Focardi, F. L. Luccio and H. A. M. Wahsheh, "Usable cryptographic QR codes," 2018 IEEE International Conference on Industrial Technology (ICIT), 2018, pp. 1664-1669. (Year: 2018).*
(Continued)

*Primary Examiner* — Michael R Vaughan
(74) *Attorney, Agent, or Firm* — Kilpatrick Townsend & Stockton LLP

(57) ABSTRACT

Systems and methods are disclosed for securely communicating sensitive data (e.g., interaction data) during a process for offline authentication. A data packet may be received by an access device from a user device in a one-way communication. The data packet may be converted to obtain interaction data comprising a digital certificate certified by the certificate authority and a digital signature value generated by the user device. A second public key associated with the user device may be obtained utilizing the digital certificate and the first public key associated with the certificate authority. The validity of the interaction data may be determined based at least in part on the digital signature value and the second public key associated with the user device. When the interaction data is determined to be valid, an identifier of the interaction data may be authorized and access may be provided based on this authorization.

18 Claims, 8 Drawing Sheets

(52) U.S. Cl.
CPC .......... *H04L 9/3268* (2013.01); *H04L 9/3297* (2013.01)

(58) Field of Classification Search
CPC ....... H04L 9/3247; G06F 21/36; G06F 21/33; G06F 21/64; G09C 5/00
See application file for complete search history.

(56) References Cited

U.S. PATENT DOCUMENTS

| | | | |
|---|---|---|---|
| 10,849,169 B2* | 11/2020 | Tachibana | .......... G06K 7/10722 |
| 11,303,450 B2 | 4/2022 | Ngo et al. | |
| 2007/0234042 A1 | 10/2007 | Gantman et al. | |
| 2012/0308003 A1 | 12/2012 | Mukherjee | |
| 2012/0330845 A1 | 12/2012 | Kang | |
| 2013/0144663 A1 | 6/2013 | Qawami et al. | |
| 2013/0179681 A1 | 7/2013 | Benson et al. | |
| 2014/0282961 A1 | 9/2014 | Dorfman et al. | |
| 2015/0039664 A1 | 2/2015 | Iyer et al. | |
| 2015/0108211 A1* | 4/2015 | Higgins | ................... G06K 5/00 235/375 |
| 2015/0220917 A1 | 8/2015 | Aabye et al. | |
| 2015/0278795 A1 | 10/2015 | Jiang et al. | |
| 2015/0339664 A1 | 11/2015 | Wong et al. | |
| 2016/0248479 A1 | 8/2016 | Bellenger et al. | |
| 2017/0006028 A1 | 1/2017 | Tunnell et al. | |
| 2017/0111170 A1 | 4/2017 | Baghdasaryan | |
| 2017/0242480 A1* | 8/2017 | Dees | ..................... G06F 3/013 |
| 2017/0330226 A1 | 11/2017 | Kuenzi et al. | |
| 2018/0068290 A1* | 3/2018 | Xia | ..................... H04L 63/0846 |
| 2018/0232611 A1 | 8/2018 | Guo | |
| 2018/0276666 A1 | 9/2018 | Haldenby et al. | |
| 2019/0122202 A1* | 4/2019 | Sun | .................... G06Q 20/3829 |
| 2019/0295077 A1 | 9/2019 | Mardikar | |
| 2020/0013026 A1 | 1/2020 | Noonan et al. | |
| 2020/0186366 A1* | 6/2020 | Klink | .................... H04W 12/35 |
| 2020/0195634 A1 | 6/2020 | Buerger et al. | |
| 2021/0334799 A1* | 10/2021 | Knorr | .................... G06Q 20/02 |

FOREIGN PATENT DOCUMENTS

| | | | | |
|---|---|---|---|---|
| JP | 11502331 | A | 2/1999 | |
| JP | 2001249901 | A | 9/2001 | |
| JP | 2009129377 | A | 6/2009 | |
| JP | 2009171432 | A | 7/2009 | |
| JP | 2018513449 | A | 5/2018 | |
| WO | WO-2011156884 | A1 * | 12/2011 | ............. G06Q 20/20 |
| WO | 2017219860 | | 12/2017 | |

OTHER PUBLICATIONS

R. M. Bani-Hani, Y. A. Wahsheh and M. B. Al-Sarhan, "Secure QR code system," 2014 10th International Conference on Innovations in Information Technology (IIT), 2014, pp. 1-6. (Year: 2014).*
U.S. Appl. No. 16/226,583, Final Office Action, Mailed on Aug. 18, 2021, 12 pages.
U.S. Appl. No. 16/226,583, Non-Final Office Action, Mailed on Jan. 7, 2021, 11 pages.
U.S. Appl. No. 16/226,583, Notice of Allowance, Mailed on Dec. 2, 2021, 9 pages.
Application No. EP19899828.8, Extended European Search Report, Mailed on Jan. 14, 2022, 10 pages.
Kilani et al., "Mobile Authentication with NFC Enabled Smartphones", Electrical and Computer Engineering, Technical Report ECE-TR-14, Available Online at: https://eng.au.dk/fileadmin/DJF/ENG/PDF-filer/Tekniske_rapporter/samlet-ECE-TC-14.pdf, 2012, 109 pages.
Application No. PCT/US2019/066010, International Search Report and Written Opinion, Mailed on Apr. 10, 2020, 11 pages.
PCT/US2019/066010, "International Preliminary Report on Patentability", Jul. 1, 2021, 8 pages.
SG11202106113V, "Written Opinion", Nov. 3, 2022, 6 pages.
Application No. JP2021-535735, Office Action, Mailed on Aug. 22, 2023, 3 pages.
Application No. CN201980083805.8, Office Action, Mailed on Jun. 29, 2023, 10 pages.
Application No. CN201980083805.8, Notice of Decision to Grant, Mailed on Jan. 26, 2024, 4 pages.
Application No. EP19899828.8, Office Action, Mailed on Mar. 13, 2024, 9 pages.
Application No. JP2021-535735, Office Action, Mailed on Feb. 14, 2024, 2 pages.

* cited by examiner

| | NAME | DESCRIPTION | LENGTH (BYTES) |
|---|---|---|---|
| 1 | CERTIFICATE FORMAT | '14' | 1 |
| 2 | CERTIFICATE ENCODING | '00' | 1 |
| 3 | SUITE INDICATOR | IDENTIFIES THE ALGORITHM SUITE TO BE USED WITH THE CERTIFIED DEVICE PUBLIC KEY | 1 |
| 4 | CERTIFICATE EXPIRY DATE | YYYYMMDD, UTC | 4 |
| 5 | CERTIFICATE EXPIRY TIME | HHMM, UTC | 2 |
| 6 | CERTIFICATE SERIAL NUMBER | IDENTIFIER UNIQUE TO THE CA KEY THAT CREATES THE DEVICE CERTIFICATE | 6 |
| 7 | DEVICE PUBLIC KEY | REPRESENTATION OF THE DEVICE PUBLIC KEY (E.G., X-COORDINATE OF THE PUBLIC KEY POINT) ON THE CURVE IDENTIFIED BY THE SUITE INDICATOR DATA FIELD | NFIELD |
| 8 | PUBLIC KEY CERTIFICATE SIGNATURE | DIGITAL SIGNATURE ON THE DATA FIELDS 1-7. VERIFIABLE USING THE PUBLIC KEY OF THE CERTIFICATE AUTHORITY AND THE ALGORITHM ASSOCIATED WITH THE SUITE INDICATOR | VARIES |

*FIG. 3*

| Tag | Data Object | Length (Bytes) | Content |
|---|---|---|---|
| 85 | Payload Format Indicator | 5 | Defines version of the generated code (e.g., "CPV01") |
| 61 | Application Template | Varies | Template containing application specific data |
| 4F | ADF Name | 5-16 | Identifies an application. |
| 62 | Common Data Template | Varies | Template containing application data that is common across applications |
| 57 | Track 2 Equivalent Data | Varies up to 19 | Contains the equivalent of Track 2 data as defined in ISO 7813 |
| 82 | Application Interchange Profile | 2 | Contains data for transition to authorizing entity and/or central server computer |
| 9F10 | Application Data | Varies up to 32 | Contains data for transition to authorizing entity and/or central server computer |
| 9F26 | Application Cryptogram | 8 | Cryptogram generated by the application |
| 9F36 | Timestamp P1 | 2 | Timestamp of when QR code was generated, Part 1 |
| 9F27 | Timestamp P2 | 4 | Timestamp of when QR code was generated, Part 2 |
| 8F | Certificate Authority Public Key Index | 1 | Identifies the Certificate Authority Public Key for use with offline data authentication |
| 9F46 | Public Key Certificate | Varies | Public Key Certificate, certified by the Certificate Authority |
| 9F4B | Digital Signature | Varies | Digital Signature of some portion of the data fields above |

*FIG. 5*

TECHNIQUES FOR SECURELY PERFORMING OFFLINE AUTHENTICATION

This application is a continuation of U.S. patent application Ser. No. 16/226,583, filed on Dec. 19, 2018, the disclosure of which is herein incorporated by reference in its entirety for all purposes.

BACKGROUND

Embodiments of the present disclosure relate to securely providing sensitive data during processes for offline authentication. In some contexts, offline authentication is preferable to online authentication due to timing constraints of the receiving device (e.g., a terminal). For example, many high volume, fast paced, authentication systems (e.g., transit terminals, ticketing systems, etc.) require a user to be authenticated at the receiving device with minimal time delay.

The information provided by a user device (e.g., a mobile phone) can include sensitive data. As a result, security measures are needed to protect the user from sophisticated fraudsters who may intercept this information. Current techniques may be problematic because this sensitive data may be transmitted from one device to another. These techniques may incur transmission delay as well as enabling a fraudster to intercept the communication. The sensitive data may be too large in size to use other conventional measures.

Embodiments of the invention address these and other problems, individually and collectively.

BRIEF SUMMARY

Embodiments of the present invention are directed to methods, systems, devices, and computer readable media that can be used to securely communicate sensitive data (e.g., credentials, account data, etc.) to a receiving device. Advantageously, in embodiments of the invention, the sensitive data is communicated in a manner that is secure (e.g., prevents fraudsters from intercepting and/or obtaining the data) and that does not require updating the existing infrastructure in any significant way.

One embodiment of the invention is directed to a method for performing offline authentication. The method may comprise receiving, at an access device, a first public key associated with a certificate authority. The additional steps of the method may occur while the access device operates in an offline mode. The method may further comprise obtaining, by the access device from a one-way communication, a data packet from a user device. The method may further comprise converting, at the access device, the data packet to obtain interaction data comprising a digital certificate certified by the certificate authority and a digital signature value generated by the user device. The method may further comprise obtaining, at the access device, a second public key associated with the user device utilizing the digital certificate and the first public key associated with the certificate authority. The method may further comprise determining, at the access device, validity of the interaction data based at least in part on the digital signature value and the second public key associated with the user device. The method may further comprise, when the interaction data is determined to be valid, authorizing, at the access device, an identifier of the interaction data. The method may further comprise providing, by the access device, access based at least in part on determining that the identifier of the interaction data is authorized.

Another embodiment of the invention is directed to an access device comprising one or more memories storing computer-executable instructions, wherein executing the computer-executable instructions by the one or more processors, causes the access device to perform operations. The operations may comprise receiving, at an access device, a first public key associated with a certificate authority. The operations may further comprise obtaining, by the access device (e.g., while operating in an offline mode) from a one-way communication, a data packet from a user device. The operations may further comprise converting, at the access device (e.g., while operating in an offline mode), the data packet to obtain interaction data comprising a digital certificate certified by the certificate authority and a digital signature value generated by the user device. The operations may further comprise obtaining, at the access device (e.g., while operating in an offline mode), a second public key associated with the user device utilizing the digital certificate and the first public key associated with the certificate authority. The operations may further comprise determining, at the access device (e.g., while operating in an offline mode), validity of the interaction data based at least in part on the digital signature value and the second public key associated with the user device. The operations may further comprise, when the interaction data is determined to be valid, authorizing, at the access device (e.g., while operating in an offline mode), an identifier of the interaction data. The operations may further comprise providing, by the access device (e.g., while operating in an offline mode), access based at least in part on determining that the identifier of the interaction data is authorized.

Another embodiment of the invention is directed to a (non-transitory) computer readable medium. The computer readable medium comprises code for performing the methods discussed herein. In some embodiments, a computing device such as a portable user device may comprise this computer-readable medium.

These and other embodiments of the invention are described in further detail below, with reference to the figures.

BRIEF DESCRIPTION OF THE DRAWINGS

FIG. 3 depicts an exemplary certificate specification, according to some embodiments.

FIG. 5 depicts an exemplary data specification for a generated code, according to some embodiments.

DETAILED DESCRIPTION

Figure 1:
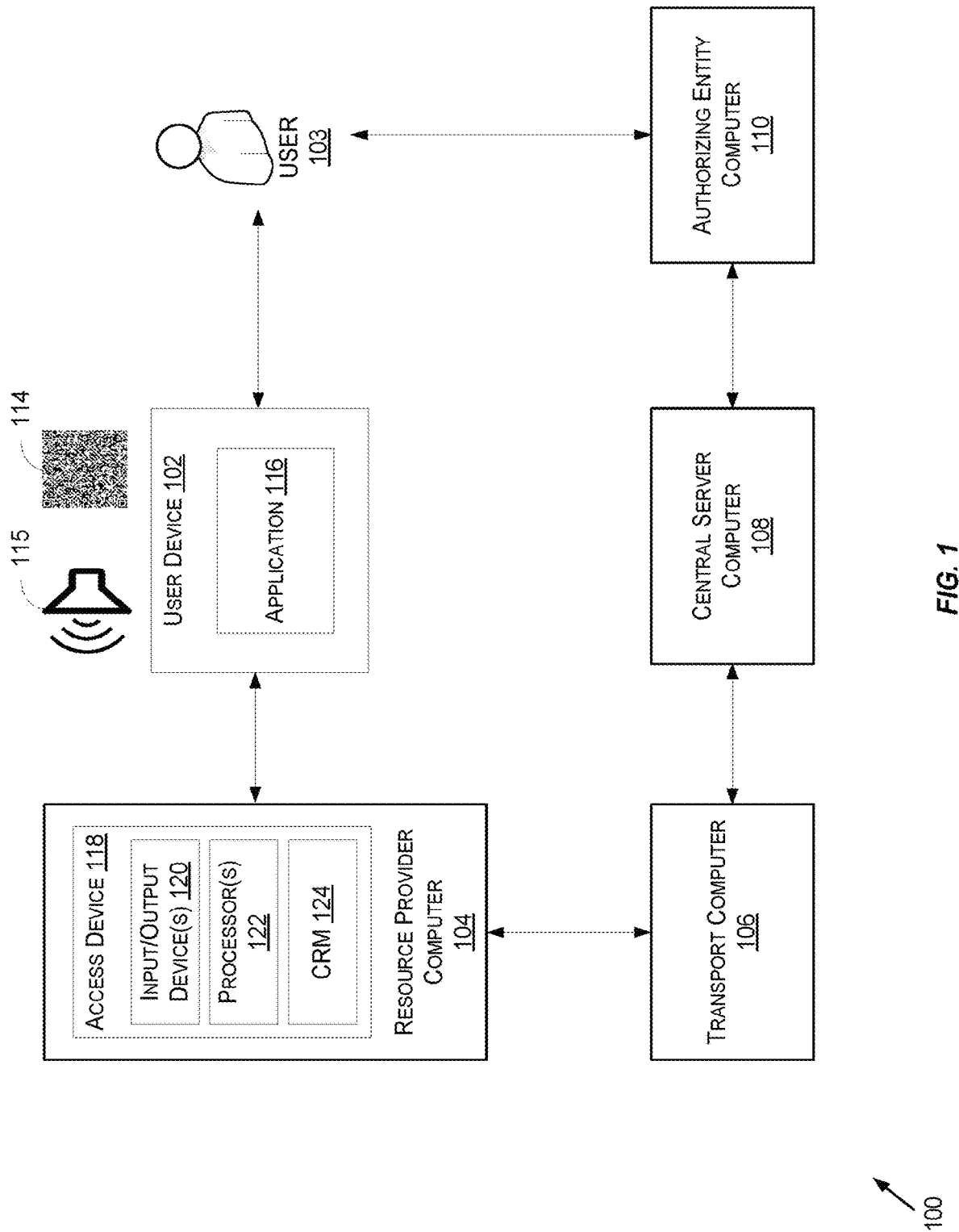
FIG. 1 shows a block diagram of a system for providing sensitive data for offline authentication, according to some embodiments.

In conventional transactions (e.g., payment transactions), an account identifier (e.g., a personal account identifier) may be passed from a portable consumer device such as a mobile phone to an access device (e.g., a POS terminal) and eventually through a traditional payment processing network. In some conventional techniques, the account identifier may be encrypted and/or obfuscated, however the encrypted/obfuscated data may still be provided in a transaction message and thus, the data field may be identifiable to potential fraudsters.

The processes described herein can be used to protect sensitive data (e.g., account data such as the account identifier) as this data is provided to a receiving device (e.g., a terminal device at a transit gate). As will be illustrated in further detail below, embodiments of the invention generate a digital signature using one or more data fields of the sensitive data and a cryptographic algorithm (e.g., an elliptic curve cryptographic algorithm). The sensitive data and the digital signature may be converted to a quick response (QR) code and presented at the user's device (e.g., via a display of a mobile phone). A terminal device may read the QR code, retrieve the underlying data, and validate the digital signature to ensure that the sensitive data has not been altered. Unlike conventional systems, embodiments herein may utilize a one-way transfer of data such that the terminal device need only obtain the QR code from the user's device display without any communications taking place between the terminal device and the user's device. Thus, the sensitive data may be communicated securely and efficiently such that an offline authentication process may be performed with a reduced risk of interception.

Before discussing detailed embodiments of the invention, some descriptions of certain terms may be useful.

A "computing device" (also referred to as a "user device") may be any suitable device that can perform computations, and that can communicate with other devices. A portable computing device such as a mobile phone is an example of a computing device. Other types of computing devices may not be portable.

A "quick response (QR) code" may include a multidimensional array of black and white squares that contains machine-readable data. A QR code may be referred to as a matrix barcode.

An "elliptic-curve cryptographic (ECC) algorithm" may include a public-key cryptographic algorithm that is based on an algebraic structure of elliptic curves over finite fields. ECC may require smaller cryptographic keys compared to non-ECC cryptographic algorithms (e.g., Ravest-Shamir-Adleman (RSA) algorithms) to provide equivalent security.

An "encrypted value" may include any suitable encrypted version of value. An encrypted value may be generated from a value (e.g., an identifier) utilizing any suitable encryption techniques utilizing, for example, symmetric and/or asymmetric encryption techniques.

"Interaction data," also referred to as "sensitive data," may include any suitable data utilized for an interaction between a user device and an access device. By way of example, interaction data may include any suitable data field depicted in FIG. 3, including, but not limited to, track 2 equivalent data (as defined in ISO 7813), timestamp information, a certificate authority (CA) public key index, a public key certificate associated with a particular user device and certified by a particular CA, a digital signature generated utilizing other data fields of the interaction data, and the like.

For purposes of this application, "payment data" can include, with respect to financial applications those data elements used by the payment service to execute a transaction, and with respect to non-financial transactions any necessary data elements exclusive of the present invention. For example, in some embodiments "payment data" can comprise Track 1 and/or Track 2 data, as that is understood by one of ordinary skill in the credit card industry, such as the primary account number, expiration date, service codes, and discretionary data. "Payment data" may also comprise a unique card identification number or a unique identification number for a service provider. The payment data may reside in a memory located on the user device (e.g., a mobile phone, etc.).

A "digital signature" may include a value that may be utilized to verify the authenticity of digital messages. A valid digital signature may give a recipient reason to believe was created by a known sender, that the sender cannot deny having sent the message, and that the message was not altered in transit.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer. An "authorizing entity computer" may be operated by, or on behalf of, an authorizing entity.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services. A "resource provider computer" may be any suitable computing device that may be operated by, or on behalf of, a resource provider.

A "processing network computer" (also referred to as a central server computer) may include a server computer used for processing network data. In some embodiments, the processing network computer may be coupled to a database and may include any hardware, software, other logic, or combination of the preceding for servicing the requests from one or more client computers. The processing network computer may comprise one or more computational apparatuses and may use any of a variety of computing structures, arrangements, and compilations for servicing the requests from one or more client computers. In some embodiments, the processing network computer may operate multiple server computers. In such embodiments, each server computer may be configured to process transaction for a given region or handles transactions of a specific type based on transaction data.

The processing network computer may include data processing subsystems, networks, and operations used to support and deliver authorization services, exception file services, and clearing and settlement services. An exemplary processing network computer may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services.

The processing network computer may use any suitable wired or wireless network, including the Internet.

An "authorization request message" may be an electronic message that is sent to a transaction processing computer and/or an authorizing entity computer (e.g., issuer of a payment card) to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an authorizing entity computer or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that an authorizing entity (e.g., an issuer bank) returns in response to an authorization request message in an electronic message (either directly or through the transaction processing computer) to a resource provider computer that indicates approval of the transaction. The code may serve as proof of authorization. In some embodiments, a transaction processing computer may generate or forward the authorization response message to the resource provider.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

FIG. 1 shows a block diagram of a system 100 for providing sensitive data for offline authentication, according to some embodiments. The system 100 may be used to facilitate data communications utilizing the various computers depicted in FIG. 1 for authentication, access control, and/or authorizing financial and/or non-financial transactions. The system 100 includes a user device 102, a resource provider computer 104, a transport computer 106, a central server computer 108, and an authorizing entity computer 110. Each of these systems and computers may be in operative communication with each other. For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications protocol.

The user device 102 may be in any suitable form. For example, the user device 102 may include cellular phones, personal digital assistants (PDAs), a net book, a smart watch, a laptop computer, pagers, smart media, and the like.

In some embodiments, user device 102 may include circuitry that is used to enable certain device functions, such as telephony. The functional elements responsible for enabling those functions may include one or more processors that can execute instructions that implement the functions and operations of the user device 102. The processor(s) may access memory of the user device 102 to retrieve instructions or data used in executing the instructions, such as provisioning scripts and mobile applications. The user device 102 may include input/output elements, such as a keyboard, a display, a speaker, a microphone, and/or a touchscreen. These I/O elements may be used to enable a user to operate the user device 102 and input data. These input/output elements may also be configured to output data, via a speaker of the device, for example. The user device 102 may also use a display to output data.

The user device 102 may include memory that may comprise an application (e.g., application 116) and/or any other suitable module or data. The user device 102 may have any number of applications installed or stored on the memory. The memory of user device 102 may also comprise code, executable by one or more processors for implementing the methods discussed herein. In some embodiments, the memory may be configured to store sensitive data (e.g., payment data (e.g., track 2 data), a private key of a public/private key pair, a certificate including a public key of the public/private key pair). The application 116 may be configured to receive a private key and/or a certificate including a corresponding public key. The public/private key pair may be provisioned by a certificate authority (e.g., the central server computer 108) and the certificate may be certified by the certificate authority. In some embodiments, the certificate may be digitally signed using a public key of the certificate authority such that a public key of the user device 102 may be retrieved utilizing a public key of the certificate authority and a cryptographic algorithm.

In some embodiments, the application 116 may be configured to cause the processors of the user device 102 to generate a code (e.g., a QR code, a sound embedding data, etc.) that includes the sensitive data. Once generated, the code may be presented at a display (and/or a speaker) of the user device 102 such that the code is obtainable by a receiving device (e.g., the access device 118).

The resource provider computer 104 may be operated by or on behalf of a resource provider (e.g., a merchant) and the transport computer may be associated with the resource provider. For example, the transport computer may be operated by an acquirer (e.g., a financial institution) responsible for managing an account associated with the resource provider. The authorizing entity computer 110 may be operated by an issuer (e.g., another financial institution). In some embodiments, entities are both acquirers and issuers, and embodiments of the invention include such entities.

The central server computer 108 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The central server computer 108 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The central server computer 108 may use any suitable wired or wireless network, including the Internet.

In some embodiments, the central server computer 108 (or another suitable system) may be configured to be a certificate authority. Operating as a certificate authority, the central server computer 108 may be configured to generate public/private key pairs for any suitable number of user devices and to generate corresponding certificates including the public key of a respective key pair. In some embodiments, the central server computer 108 may digitally sign each certificate utilizing a public key associated with the central server computer 108. The central server computer 108 may further be configured to distribute its public key to any suitable number of devices (e.g., the access device 118).

The resource provider computer 104 may also have, or may receive communications from, an access device 118 that can interact with the user device 102. In FIG. 1, the access device 118 is located at the resource provider computer 104. However, it could be located at any other suitable location in other embodiments of the invention. The resource provider computer 104 may include any suitable computational apparatus operated by a resource provider (e.g., a merchant). In some embodiments, the resource provider computer 104 may include one or more server computers that may host one or more websites associated with the resource provider (e.g., a merchant). In some embodiments, the resource provider computer 104 may be configured to send data to a central server computer 108 via a transport computer 106 as part of a payment verification and/or authentication process for a transaction between the user (e.g., consumer) and the resource provider. The resource provider computer 104 may also be configured to generate authorization request messages for transactions between the resource provider and the user 103, and route the authorization request messages to the authorizing entity computer 110 (e.g., via the central server computer 108) for additional transaction processing.

The access devices according to embodiments of the invention can be in any suitable form. Examples of access devices include point of sale (POS) devices, cellular phones, PDAs, personal computers (PCs), tablet PCs, turnstiles, handheld specialized readers, set-top boxes, electronic cash registers (ECRs), automated teller machines (ATMs), virtual cash registers (VCRs), kiosks, security systems, access systems, and the like. The access device 118 may include input/output (I/O) device(s) 120, a processor(s) 122, and a computer readable medium 124. The I/O device(s) 120 may include an imaging device (e.g., a camera), a digital scanner, a barcode reader, a microphone, etc., configured to interact with the user device 102. In some embodiments, the access device 118 may be configured to manage access to a resource. By way of example, the access device 118 may be located at a turnstile at a transit gate of a transit station and the access device 118 may manage operation of the turnstile to allow access to a portion of the transit station.

In a typical access transaction, the user 103 may utilize application 116 to generate a visual and/or audio code (e.g., a QR code, a sound embedding data, etc.) at the user device 102. For example, the application 116 may be utilized to generate QR code 114 and/or sound 115. To generate the visual and/or audio code (e.g., the QR code 114, the sound 115, etc.) the user device 102 may retrieve interaction data (e.g., payment data such as track 2 data as defined in ISO 7813, a certificate authority (CA) public key index, a public key certificate associated with the user device 102, a token/cryptogram, etc.) stored in memory at the user device 102. At least some of the interaction data may be stored in response to a registration process conducted with the user device 102 with a certificate authority (e.g., the central server computer 108) prior to the initiating of the access transaction. The user device 102 may further be configured to generate a digital signature utilizing at least some data fields of the interaction data and a cryptographic algorithm (e.g., an elliptic curve cryptographic algorithm). The interaction data and the digital signature may be converted to a visual and/or code (e.g., the QR code 114 and/or the sound 115) and presented at the user device 102 (e.g., via a display, via a speaker, respectively). The user 103 may hold the user device 102 near the access device 118 such that the I/O device(s) 120 (e.g., a QR scanner, a microphone, etc.) may be utilized to capture the visual and/or audio code. The processor(s) 122 of the access device 118 may be configured to convert the captured code to retrieve the underlying data (e.g., the interaction data embedded in the QR code 114 and/or the sound 115).

Once converted, the processor(s) 122 of the access device 118 may retrieve a CA public key index from interaction data. The CA public key index may be associated with a particular public key associated with a particular CA and stored in memory at the access device 118. In some embodiments, the access device 118 may store multiple public keys, each corresponding to a particular CA and each being associated with a unique CA public key index. Using the CA public key index of the interaction data, the access device 118 may identify the certifying authority (and its stored public key) of the public key certificate included in the interaction data. The retrieved CA public key may be utilized with the public key certificate of the interaction data as input into a cryptographic algorithm in order to retrieve the public key that is certified by the CA (e.g., the central server computer 108) and associated with the user device 102.

Once retrieved, the public key obtained from the certificate and associated with the user device 102 may be utilized to validate a digital signature of the interaction data. In some embodiments, the access device 118 may utilize the digital signature and the public key of the user device 102 as input into a cryptographic algorithm (an elliptic curve cryptographic algorithm) to retrieve a hash value corresponding to one or more data fields of the interaction data. The one or more corresponding data fields of the interaction data may be rehashed by the access device 118 and a resultant value may be compared to the retrieved hash value. If the resultant hash matches the retrieved hash, the access device 118 may determine that the interaction data is valid (e.g., unaltered). If the hashes do not match, the access device 118 may determine that the interaction data is invalid (e.g., altered) and no further processing may take place.

In some embodiments, if the interaction data is determined to be valid, the access device 118 may be configured to compare timestamp data of the interaction data to a current time to determine if the visual and/or audio code was generated within a predetermined threshold period of time (e.g., within the last 10 minutes, within the last 5 minutes, etc.). In some embodiments, if the timestamp data of the interaction data is stale (e.g., indicating a generation time outside the predetermined threshold period of time), the access device 118 may deny access and no further processing may take place. If the timestamp data of the interaction data indicates a time within the predetermined threshold period of time, the access device 118 may be configured to retrieve an identifier (e.g., an account identifier) from the interaction data. This identifier may be compared by the access device 118 to a stored restriction list (e.g., a list of account identifiers for which access is to be immediately denied). If the identifier from the interaction data does not match any of the identifiers of the stored restriction list, the access device 118 may be configured to grant the user device 102 access. By way of example, if the access device 118 is a turnstile at a transit gate of a transit station, the access device 118 may enable the turnstile to turn in order to allow the user 103 access to a portion of the transit station.

At any suitable time subsequent to enabling the user 103 and/or user device 102 access, the access device 118 may be configured to cause the resource provider computer 104 to perform an online authorization process utilizing at least a portion of the interaction data obtained during the offline authentication process. For example, the resource provider computer 104 (or the access device 118) may be configured to generate an "authorization request message" and forward this message to the transport computer 106. The transport computer 106 is typically associated with a business entity (e.g., a commercial bank) that has a business relationship with a particular resource provider (e.g., merchant) or other entity and that may be involved in the process of transaction. The transport computer 106 may issue and manage accounts for resource providers and exchange funds with the authorizing entity computer 110 on behalf of the resource provider. Some entities can perform both authorizing entity computer 110 and transport computer 106 functions. Embodiments of the present invention encompass such single entity issuer-acquirer computers. After receiving the authorization request message, the transport computer 106 may send the authorization request message to the central server computer 108. The central server computer 108 may then forward the authorization request message to the authorizing entity computer 110, or a third party entity acting on behalf of the authorizing entity, of the user device 102.

The central server computer 108 may be a network that includes or operates at least one server computer used for processing (e.g., payment processing). The server computer in the central server computer 108 may include a processor and a computer readable medium coupled to the processor, the computer readable medium comprising code, executable by the processor for performing the functionality described herein. In some embodiments, the server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments, the central server computer 108 may operate multiple server computers. In such embodiments, each server computer may be configured to process transaction for a given region or handles transactions of a specific type based on transaction data.

The central server computer 108 may include data processing subsystems, networks, and operations used to support and deliver authorization services, exception file services, and clearing and settlement services. The central server computer 108 may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The payment processing network may use any suitable wired or wireless network, including the Internet.

The central server computer 108 may process transaction request messages and determine the appropriate destination (e.g., authentication computer(s)) for the transaction request messages. The central server computer 108 may also handle and/or facilitate the clearing and settlement of transactions.

The authorizing entity computer 110 is typically associated with a business entity (e.g., a bank) which issues and maintains consumer accounts for a consumer. The authorizing entity computer 110 may issue payment devices for the consumer account, including credit cards and debit cards, and the like.

After the authorizing entity computer, or a third party entity acting on behalf of the authorizing entity, receives the authorization request message, the authorizing entity computer 110, or the third party entity acting on behalf of the issuer, may send an authorization response message back to the central server computer 108 to indicate whether or not the current transaction is authorized (or not authorized). The central server computer 108 then forwards the authorization response message back to the transport computer 106. The transport computer 106 may then send the response message back to the resource provider computer 104. In some embodiments, the resource provider computer 104 may notify the user device 102 of the transaction (e.g., via a notification, an email, or any suitable electronic means of communication).

At the end of the day, a normal clearing and settlement process can be conducted by the system 100. A clearing process is a process of exchanging financial details between and acquirer and an issuer to facilitate posting to a user's account and reconciliation of the user's settlement position.

By utilizing the techniques described herein, a more secure manner for communicating sensitive data is enabled. The sensitive data may be embedded in a visual and/or audio code to shield such data from the eyes and ears of fraudsters. Additionally, the sensitive data is communicated through a reader and/or a microphone of the receiving device directly, reducing the chance that the data may be intercepted and potentially altered or stolen. Through utilization of the techniques described here, the overall data footprint of the sensitive data may be reduced while still obtaining the same degree of security with respect to conventional techniques. Through communication of this data, a method for offline authentication is enabled that allows for a user to be authenticated at the receiving device in a minimal amount of time and without obtaining any additional data from a server regarding the user and/or user device.

Figure 2:
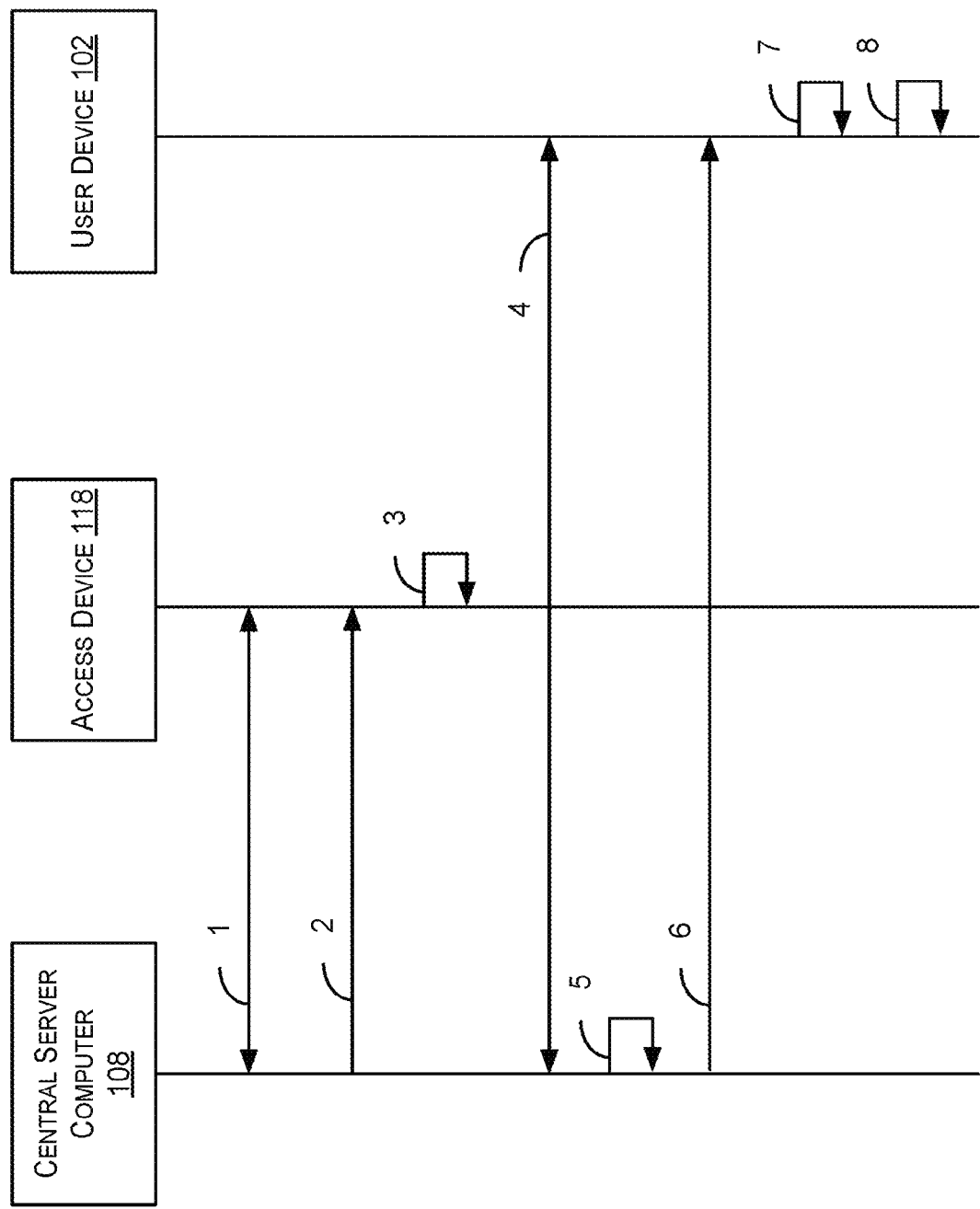
FIG. 2 depicts a registration method, according to some embodiments.

FIG. 2 depicts a registration method (e.g., method 200), according to some embodiments. It should be appreciated that the steps of method 200 may be performed in any suitable order. In the example provided in FIG. 2, the central server computer 108 may operate as a certificate authority. Accordingly, the central server computer 108 may be configured to generate a public/private key pair for itself and distribute its public key to any suitable number of devices. The central server computer 108, operating as a certificate authority may further be configured to generate public/private key pairs for one or more devices (e.g., the user device 102) and distribute the private key and a certificate that includes the corresponding public key to each respective device. These functions may be achieved through the method 200.

By way of example, the method 200 may begin at step 1, where data may be exchanged between central server computer 108 (operating as a certificate authority) and the access device 118. The access device 118 may, for example, request the public key of the central server computer 108 via any suitable user interface and/or application programming interface and/or message. Through receipt of this request, the central server computer 108 may be configured to maintain a mapping indicating that future public keys generated for the central server computer 108 are to be provided to the access device 118. In some embodiments, the central server computer 108 may generate a new public/private key pair periodically (e.g., every 24 hours, every 12 hours, etc.). The central server computer 108 may associated its public key with a certificate authority public key index. This index may be any suitable alphanumeric value that uniquely identifies the central server computer 108 from other potential certificate authorities.

At step 2, the central server computer 108 may provide its public key and its certificate authority (CA) public key index to the access device 118. This may occur in response to a request from the access device 118. In some embodiments, the public key may be provided within some threshold period of time of creation. That is, the public key may be provided independent of a request from the access device 118. Rather, a new public key may be furnished by the central server computer 108 shortly after the new public key was generated.

At step 3, the access device 118 may store the received public key with an association to the CA public key index in local memory. In some embodiments, the access device 118 may be configured to store multiple CA public key indexes associated with various certificate authorities in a mapping, database, or other suitable storage container. The CA public key index may be utilized to retrieve the associated public key of the CA corresponding to the CA public key index.

At step 4, the user device 102 may register with the central server computer 108 (operating as a certificate authority). The registration process performed at step 4 may utilize any suitable user interface, application programming interface, or any suitable means of communication. By way of example only, the user device 102 may utilize an application (e.g., the application 116 of FIG. 1) to provide account information such as name, address, a government identification identifier, payment data, and/or the like.

At step 5, upon receiving such data, or by direct request from the user device 102, the central server computer 108 may be configured to generate a public/private key pair for the user device 102. In some embodiments, the central server computer 108 may generate a public key certificate from the public key associated with the user device 102. FIG. 3 depicts an exemplary certificate specification 300 (e.g., a public key certificate for user device 102), according to some embodiments.

The public key certificate for user device 102 may include the same, more, or fewer data fields than those depicted in FIG. 3. Although some of data fields 1-8 are shown with a particular data size (in bytes), it should be appreciated that the data fields may differ in data size from those depicted.

In some embodiments, the public key certificate may include data field 1, corresponding to a certificate format. In some embodiments, the certificate format may identify a particular formatting specification for the certificate. By way of example, as depicted in FIG. 3, the public key certificate may utilize format "14."

In some embodiments, the public key certificate may include data field 2, corresponding to a certificate encoding. In the example depicted in FIG. 3, the public key certificate may utilize an encoding of "00."

In some embodiments, the public key certificate may include data field 3, corresponding to a suite indicator. In the example depicted in FIG. 3, the suite indicator may identify an algorithm suite to be used with the certified public key associated with the user device 102.

In some embodiments, the public key certificate may include data field 4, corresponding to a certificate expiry date. The certificate expiry date may indicate a date (e.g., in the format YYYYMMDD, UTC) after which the certificate may be considered expired and unusable. The public key certificate may further include data field 5, a certificate expiry time. The certificate expiry time may indicate a time (e.g., in the format HHMM, UTC, or any suitable format) associated with the certificate expiry data after which the certificate may be considered expired and unusable.

In some embodiments, the public key certificate may include data field 6, corresponding to a certificate serial number. The certificate serial number may be any suitable alphanumeric value that identifies the CA private key that was used to create the certificate.

In some embodiments, the public key certificate may include data field 7, corresponding to a public key associated with a device (e.g., the user device 102). In some embodiments, the public key associated with the device may be generated based on an elliptic curve algorithm corresponding to the suite indicator (e.g., data field 3). In some embodiments, the data field 7 may correspond to an x-coordinate of the public key point on the curve identified by the suite indicator.

In some embodiments, the public key certificate may include data field 8, corresponding to public key certificate signature. Data field 8 may contain a digital signature generated by the certificate authority utilizing a private key associated with the certificate authority. In some embodiments, the digital signature may pertain to each of the data fields 1-7 (or any suitable combination of the data fields of the certificate). As a non-limiting example, the data fields 1-7 may be hashed using any suitable hashing algorithm, and the resultant hash value, along with the certificate authority private key may be utilized as input in a cryptographic algorithm (e.g., an elliptic curve cryptographic algorithm)

corresponding to the suite indicator (e.g., data field 3). The resultant value may be stored in data field 8 as the digital signature of the certificate.

Returning to FIG. 2, the generated digital certificate and the private key associated with the user device 102 may be provided to the user device 102 at step 6. At step 7, the user device 102 may store the digital certificate and the private key in local memory for later use.

At step 8, the user (e.g., the user 103 of FIG. 1) of the user device 102 may utilize any suitable user interfaces of the user device 102 (e.g., a user interface provided by the application 116) to enter any suitable portion of sensitive data. By way of example, the user may enter in payment data (e.g., an example of sensitive data) such as a debit/credit card number, expiration date, and/or an associated CVV code. In some embodiments, a camera of the user device 102 may be utilized to capture an image of a debit and/or credit card and payment data may be extracted from the image utilizing any suitable image recognition techniques. In this context, "payment data" may include any suitable portion of track 2 equivalent data as defined in ISO 7813. The payment data (and/or any suitable portion of sensitive data entered by the user) may be stored in local memory at the user device 102.

Figure 4:
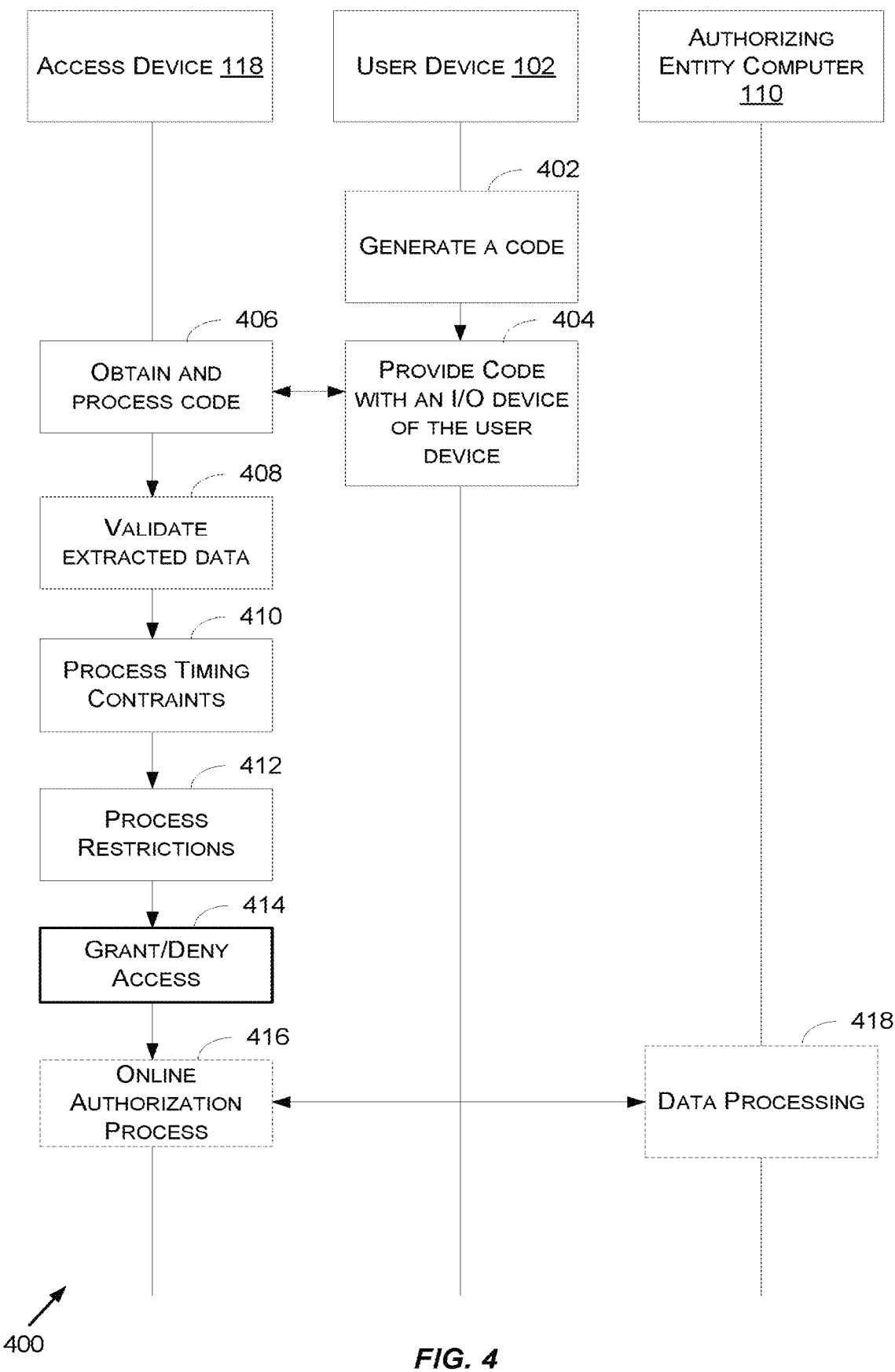
FIG. 4 shows a flowchart for a method for securely communicating sensitive data to perform offline authentication, according to some embodiments.

FIG. 4 shows a flowchart for a method 400 for securely communicating sensitive data to perform offline authentication, according to some embodiments. The method 400 may be performed at any suitable time subsequent to performing the method 200 of FIG. 2.

The method 400 may begin at 402, where the user device 102 may generate a visual and/or audio code (e.g., QR code 114 of FIG. 1, sound 115 of FIG. 1, etc.). In some embodiments, the generated code may include/embed at least a portion of sensitive data stored in local memory of the user device 102. By way of example, sensitive data may be stored in local memory due to performing step 8 of method 200. The sensitive data may include any suitable track 2 equivalent data as defined in ISO 7813 and/or any suitable data related to the user. FIG. 5 depicts an exemplary data specification 500 for the generated code, according to some embodiments.

In some embodiments, the generated code may include any suitable combination of the data fields included in the data specification 500. Although a particular data size may be indicated for each data field of the data specification 500, it should be appreciated that these sizes may vary.

In some embodiments, the generated code may include a payload format indicator. A payload format indicator may be identified with a tag "85" (or any suitable identifier) and/or may define a version of the generated code. By way of example, if the generated code is a QR code, the version of the QR code may be indicated using the payload format indicator (e.g., a value "CPV01"). If the generated code is in a sound format, the version of the generated code may be indicated using a different payload format indicator. In some embodiments, multiple versions of the generated code may be employed. Accordingly, the payload format indicator may be utilized by a receiving device (e.g., the access device 118 of FIG. 1) to determine the format of the code.

In some embodiments, as provided by the data specification 500, the generated code may include an application template. An application template may be identified with a tag "61" (or any suitable identifier) and may be utilized as a container for application specific data. By way of example, the application template data field may include one or more subfields such as an application name field. In some embodiments, the application name field may be identified with a tag "4F" (or any suitable identifier). In some embodiments, the application name field may identify a type and/or name of an application that may process and/or generate the data contained in the data specification 500.

In some embodiments, as provided by the data specification 500, the generated code may include a common data template (e.g., a portion of the data specification 500). The common data template may be identified with a tag "62" (or any suitable identifier) and may be utilized as a container for application data that may be common across various types of applications. By way of example, the common data template may include one or more subfields such as track 2 equivalent data field, an application interchange profile data field, an application data field, an application cryptogram data field, one or more timestamp data fields, a certificate authority public key index, a public key certificate data field, and a digital signature data field.

A track 2 equivalent data field may be identified with a tag of "57" (or another suitable identifier). The track 2 equivalent data field may include any track 2 data as defined in ISO 7813. By way of example, track 2 equivalent data may include a personal account number (PAN), and expiry date, a CVV code, a transaction counter, or the like. In some embodiments, the track 2 equivalent data field may vary in size up to some predetermined size (e.g., 19 bytes).

An application interchange profile data field of the common data template may be identified with a tag of "82" (or another suitable identifier). An application data field may also be included in the common data template. The application data field may be identified with a tag of "9F10" (or another suitable identifier). The application interchange profile data field and/or the application data field may each contain data for an authorizing entity (e.g., the authorizing entity computer 110 of FIG. 1) and/or central server computer (e.g., the central server computer 108 of FIG. 1). Each of these fields may vary in size. For example, the application interchange profile data field may be two bytes in length, while the application data field may vary in size up to a predetermined size (e.g., 32 bytes).

An application cryptogram of the common data template may be identified with a tag of "9F26" (or another suitable identifier). In some embodiments, a cryptogram value may be generated by the user device to identify a particular code. The cryptogram may be unique to the generated code. In some embodiments, the cryptogram may be any suitable size (e.g., up to 8 bytes).

The common data template may include one or more timestamp data fields. For example, timestamp data may be stored in two data fields. Each of these data fields may be identified with the tags "9F36" and "9F27," respectively (or other suitable identifiers). The combined data of these two data fields may contain a date and/or a time by which the code was generated. In some embodiments, a single data field may be utilized to store such timestamp data.

The common data template may include a certificate authority public key index data field. This data field may be identified with a tag "8F" (or another suitable identifier). The certificate authority public key index may include a value that identifies the certificate authority that generated the public key certificate contained in the public key certificate field. In some embodiments, the certificate authority public key index may be retrieved from this data field and utilized to identify a particular public key corresponding to the certificate authority.

The common data template may include a public key certificate data field. This data field may be identified by a tag "9F46" (or another suitable identifier). In some embodiments, the public key certificate data field may contain a digital certificate (e.g., a digital certificate formatted according to the certificate specification 300 of FIG. 3). The public key certificate data field may be any suitable size to contain any suitable combination of the data fields of FIG. 3 corresponding to the public key certificate associated with a particular device (or a particular user and/or account).

The common data template may further include a digital signature data field. This data field may be identified by a tag "9F4B" (or any suitable identifier). The digital signature data field may contain a value corresponding to a digital signature of one or more other data fields of the code. By way of example, a user device may be configured to hash the values of all (or some portion) of the other data fields discussed in FIG. 5 to generate a hashed value. The user device may then utilize a private key and a cryptographic algorithm (e.g., an elliptic curve cryptographic algorithm) to generate a digital signature value. This value may then be stored in the digital signature data field for subsequent validation processes.

Returning to FIG. 4, at step 402 the user device 102 may generate a code from sensitive data (e.g., sensitive data corresponding to the data fields of the data specification 500 of FIG. 5). The sensitive data may be collected from local memory of the device. In some embodiments, the user device 102 may generate at least some of the sensitive data. By way of example, the user device 102 may hash any suitable number of data fields of the sensitive data (e.g., the shaded fields indicated in FIG. 5, corresponding to the track 2 equivalent data field, the application interchange profile data field, the application data field, and one or more timestamp data fields). The hash value and the user device 102 private key (stored in local memory) may be utilized with a cryptographic algorithm to generate a digital signature. This digital signature may then be included in the sensitive data prior to be converted to and/or utilized to generate the code. In some embodiments, this code may be visual, such as a quick response (QR) code. In some embodiments, the data discussed in connection with the data specification 500 may be converted to a QR code utilizing any suitable process.

As a non-limiting example of the conversion/code generation process, the data shown in the data specification 500 (e.g., sensitive data) may be converted into a base-64 encoded string (e.g., as defined in RFC 4648) and then converted into an ISO 18004 compliant QR code symbol. In some embodiments, this conversion may utilize a default extended channel interpretation and byte mode. This conversion may further utilize error correction levels L, M, Q, or H and the value of p as defined in ISO 18004. In some embodiments, the conversion may determine the smallest QR code version that will accommodate the data shown in the data specification 500 (or rather the actual data being converted). Data masking may be performed during this conversion as defined in ISO 18004 and a normal orientation and normal reflectance arrangement may be utilized according to ISO 18004.

In some embodiments, rather than a visual code (or in addition to the visual code) the user device 102 may generate an audio code. As a non-limiting example, the user device 102 may utilize any suitable frequency-shift keying (FSK) and/or frequency modulation scheme to convert the sensitive data to a sound. FSK and/or frequency modulation are intended to refer to techniques by which digital data may be represented through changes in the frequency (or pitch) of an audio tone. This digital data may then be transmitted as a sound and the embedded data extracted through interpretation of these pitch changes/modulations.

At 404, the generated code may be provided at an I/O device of the user device. If the generated code is a visual code (e.g., a QR code embedding the sensitive data), the generated code may be provided at a display of the user device 102. If the generated code is an audio code (e.g., a sound embedding the sensitive data), the generated code may be presented via a speaker of the user device 102. In some embodiments, the user device 102 may generate a visual code and an audio code and present each of the generated codes via a display and a speaker of the user device 102, respectively.

At 406, the code may be obtained by the access device 118. By way of example, the access device 118 may include a barcode reader, a scanner, a camera, or any suitable input/output (I/O) device configured to capture a visual code (e.g., the QR code 114 of FIG. 1). In some embodiments, this visual code may be presented at the display of the user device 102 and read by the I/O device of the access device 118. In some embodiments, the access device 118 may include microphone or another suitable I/O device configured to capture an audio code (e.g., the sound 115 of FIG. 1). Once obtained the code (or codes) may be converted according to a predetermined scheme. By way of example, a QR code may be converted back to binary data to extract the embedded sensitive data. If the code is in the form of sound, the various modulations of the sound may be interpreted according to a predetermined scheme to extract the embedded sensitive data.

At 408, the access device 118 may validate the data extracted from the code(s). In some embodiments, the access device 118 may obtain a certificate public key index value from the sensitive data extracted from the code. The access device 118 may utilize the obtained certificate public key index value to perform a lookup and/or retrieve a public key associated with the certificate public key index value. The access device 118 may potentially store multiple public keys, each being associated with a different certificate authority. Utilizing the certificate public key index value may ensure that the correct public key associated with the certifying certificate authority (e.g., the certificate authority that is credited with generating the public key certificate included in the extracted sensitive data) is used. Once the CA's public key is retrieved, it may be utilized with a cryptographic algorithm (e.g., an elliptic curve cryptographic algorithm) to verify that the public key certificate of the sensitive has not been altered. By way of example the CA's public key and the digital signature of the certificate (e.g., data field 8 of FIG. 3) may be provided as input to a cryptographic algorithm. In some embodiments, the particular cryptographic algorithm utilized may be specified in the certificate. For example, data field 3 of FIG. 3 may specific the specific algorithm suite to be utilized to validate the digital signature of the certificate. Given the inputs described above, the cryptographic algorithm may output a resultant value. The access device 118 may, according to a predetermined scheme, hash one or more data fields (e.g., data fields 1-7 of FIG. 3) of the digital certificate to calculate a hash value. If the calculate hash value matches the resultant value obtained from the cryptographic algorithm, the certificate may be deemed valid (e.g., unaltered). If the calculated hash value does not match the resultant value, the certificate may be deemed invalid (e.g., unaltered). If the certificate is invalid, the access device 118 may deny access to the user device 102 and terminate processing.

If the certificate is determined to be valid, the access device 118 may extract the public key (e.g., data field 7) associated with the user device 102 from the certificate. Using the retrieved public key associated with the user device 102, the access device 118 may validate the sensitive data. For example, the public key associated with the user device 102, the digital signature contained in the sensitive data, and/or any suitable portion of the sensitive data may be utilized validate the sensitive data (e.g., to determine whether or not the sensitive data has been altered). As a non-limiting example, the public key associated with the user device 102 and the digital signature may be provided as input into a cryptographic algorithm (e.g., the same or different cryptographic algorithm utilized above) to obtain a resultant value. A predetermined combination of data fields (e.g., the shaded data fields of FIG. 5 corresponding to the track 2 equivalent data field, the application interchange profile data field, the application data field, and one or more timestamp data fields) may be hashed by the access device 118 to generate a calculated hash value and the calculated hash value may be compared to the resultant value. If the values match, the access device 118 may be configured to determine that the sensitive data extracted from the code is valid (e.g., unaltered). If the value don't match the access device 118 may be configured to deny access and terminate processing.

At 410, the access device 118 may (optionally) process timing constraints. By way of example, it may be predetermined that a valid code (e.g., visual or audio code) must be generated within a predetermined time period of a request for access. That is, it may be predetermined that a code must be generated within 10 minutes, 5 minutes, 30 seconds, prior to the access device 118 obtaining and/or processing the code for the code to be valid. Accordingly, the access device 118 may be configured to compare a current time to a time indicated by the one or more timestamp data fields of the sensitive data. In some embodiments, and as described above, the one or more timestamp data fields of the sensitive data may indicate a day and/or time at which the code was generated. It should be appreciated that in some embodiments, one timestamp data field may indicate a day and another timestamp data field may indicate a time. In some embodiments, the combination of two timestamp data fields may be utilized to identify a day and/or time by which the code was generated. If the comparison indicates that the code was generated outside the allotted time period (e.g., greater than or equal to 10 minutes prior to current time), the access device 118 may be configured to deny access and terminate processing. If the comparison indicates that the code was generated within the allotted time period (e.g., within 10 minutes prior to the current time) the access device 118 may perform further operations.

In lieu of, or in addition to processing the timing constraints, the access device 118 may be configured to process restrictions at 412. In some embodiments, the access device 118 may maintain a list of restricted identifiers corresponding to identifiers to which access is to be denied. In some embodiments, the access device 118 may extract any suitable identifier from the sensitive data (e.g., an account identifier contained in the track 2 equivalent data field). The extracted identifier may be compared to the list of restricted identifiers. If the extracted identifier matches on of the identifiers on the list, the access device 118 may deny access and terminate processing. If the extracted identifier does not match any of the identifiers on the list, the access device 118 may perform further operations.

At 414, the access device 118 may be configured to grant or deny access to the user device 102 based on any suitable combination of the operations of 408-412. For example, if the sensitive data is determined to be invalid, and/or the code is determined to be stale (e.g., older than the allotted time period), and/or the identifier contained in the sensitive data matches a restricted identifier, the access device 118 may be configured to deny access to the user device 102. If the sensitive data is valid, the code was generated timely (if timing constraints are enforced), and if the identifier contained in the sensitive data does not appear on the restricted list (if a restricted list is employed), the access device 118 may be configured to grant access.

In some embodiments, the access device 118 may support online transactions. In these embodiments, the access device 118 may send an authorization request message to the authorizing entity computer 110 (e.g., via the transport computer 106 and/or the central server computer 108 of FIG. 1) at 416. The authorization request message may any suitable portion of the sensitive data. In some embodiments, the authorization request message may include an amount corresponding to a payment for the granted access. The authorizing entity computer 110 may process the data at 418 to generate an authorization response message which may be returned to the access device 118 at any suitable time. This process may be discussed in further depth with respect to FIG. 7.

Figure 6:
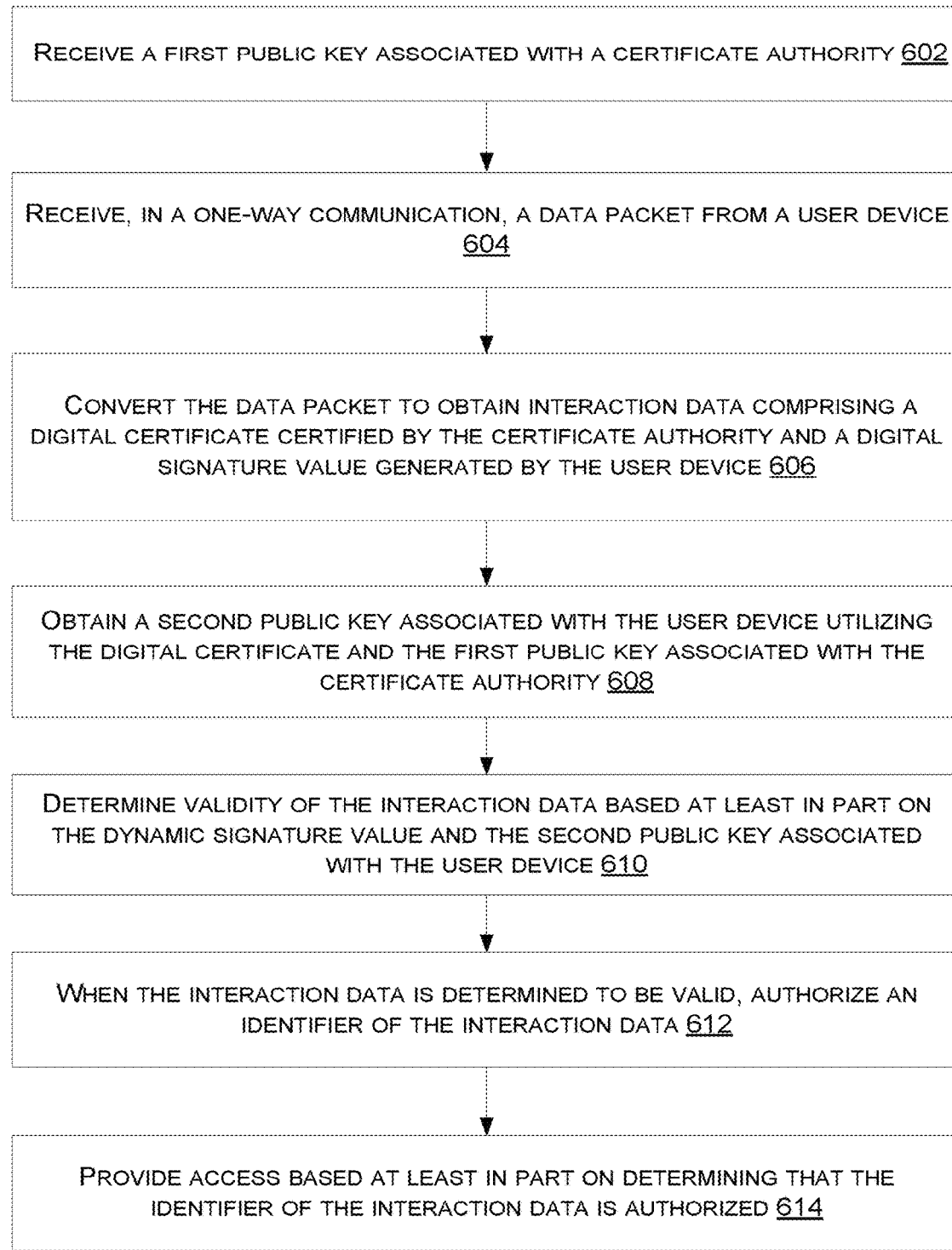
FIG. 6 shows a flowchart for a method for performing offline authentication, according to some embodiments.

FIG. 6 shows a flowchart for a method for performing offline authentication, according to some embodiments. The method 600 may be performed by a computing device (e.g., the access device 118 of FIG. 1). The computing device may comprise one or more processors and one or more memories storing computer-executable instructions, wherein executing the computer-executable instructions by the one or more processors, causes the computing device to perform the method 600. The steps shown in FIG. 6 and described below can be used in conjunction with the description of the transaction processing in FIG. 1 and its corresponding description. Those descriptions are herein incorporated by reference.

The method 600 may begin at block 602, where a first public key associated with a certificate authority (e.g., the central server computer 108 of FIG. 1, operating in part as a certificate authority) may be received. In some embodiments, the first public key may be distributed by the certificate authority in any suitable manner (e.g., according to the method 200 of FIG. 2).

The remaining steps of method 600 may be performed by the access device 118 while operating in an offline mode. In some embodiments, the access device 118 may operate in an offline mode when it does not communicate with a remote device (e.g., such as a resource provider computer, transport computer, central server computer, authorizing entity computer) to perform its processing.

The method may proceed to 604 where a data packet may be obtained in a one-way communication, from a user device (e.g., the user device 102 of FIG. 1). The data packet may include any suitable portion of sensitive data and may be the form a visual and/or audio code. By way of example, the data packet may include the data fields of data specification 500 of FIG. 5 and may be in the form of QR code, a sound, or any suitable visual and/or audio code.

At 606, the data packet may be converted to obtain interaction data (e.g., the sensitive data contained in the data packet, the data fields specified in data specification 500 of FIG. 5). For example, the data packet may comprise at least a digital certificate certified by the certificate authority (e.g., the central server computer 108) and a digital signature value generated by the user device (e.g., the user device 102).

At 608, a second public key associated with the user device (e.g., the user device 102) may be obtained utilizing the digital certificate and the first public key associated with the certificate authority. By way of example, the certificate included in the data packet may be validated in a similar manner as described at 406 of FIG. 4. The first public key and a digital signature of the digital certificate may be input into a cryptographic algorithm to obtain a resultant value. Corresponding data fields of the certificate may be hashed to generate a hash value. If the resultant value matches the hash value, the certificate may be deemed valid (e.g., unaltered). If valid, the access device may be configured to retrieve the second public key associated with the user device from the certificate.

At 610, the access device may determine validity of the interaction data based at least in part on the digital signature value and the second public key associated with the user device. As described above, also in connection with 406 of FIG. 4, the second public key and a digital signature value included in the data packet may be provided to a cryptographic algorithm to generate a resultant value. One or more data fields of the data packet may also be hashed to generate a hash value. If the resultant value matches the hash value, the data packet may be determined to be valid. If the resultant value does not match the has value, the data packet may be determined to be invalid and no further processing may take place.

At 612, when the interaction data is determined to be valid, the access device may be configured to authorize an identifier of the interaction data. By way of example, an identifier such as an account identifier may be retrieved from the interaction data (e.g., the converted data packet data). The access device may maintain a list of restricted identifiers. If the account identifier is found on the list of restricted identifiers, the access device may be configured to deny access and terminate processing.

At 614, access may be provided by the access device based at least in part on determining that the identifier of the interaction data is authorized (e.g., that the account identifier is not on the list of restricted identifiers.

Figure 7:
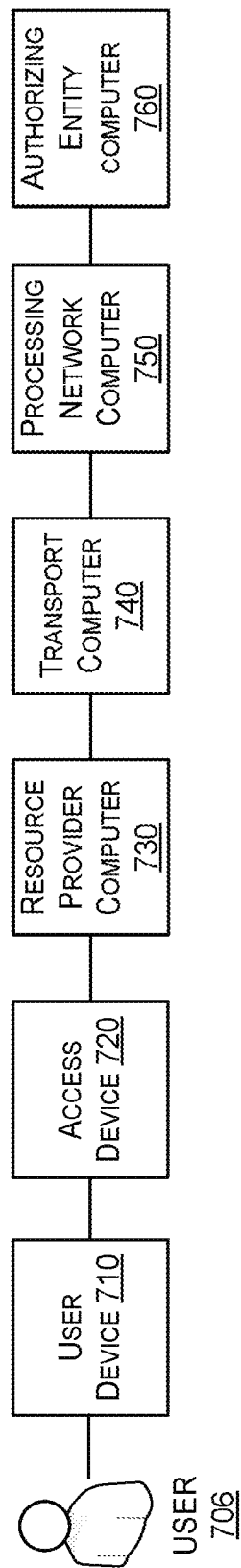
FIG. 7 shows a block diagram illustrating a transaction processing system.

FIG. 7 shows a block diagram of a transaction processing system 700. FIG. 7 shows a user 706 (e.g., the user 103 of FIG. 1) that can operate a user device 710 (e.g., an example of the user device 102 of the figures above). The user 706 may use the user device 710 to pay for a good or service, such as a ticket, at a resource provider such as a merchant (e.g., a transit authority). The merchant may operate a resource provider computer 730 and/or an access device 720 (e.g., an example of the access device 118 of the above figures). The merchant may communicate with an authorizing entity computer 760 (e.g., the authorizing entity computer 110 of FIG. 1) operated by an issuer, via a transport computer 740 (e.g., the transport computer 106) operated by an acquirer and a processing network computer 750 (e.g., an example of the central server computer 108 of FIG. 1) operating as part of a payment processing network.

The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow using a user device 710 at an access device 720 (e.g., a transit turnstile) can be described as follows. The user device 710 and the access device 720 may perform the steps of method 400 as described above. If the user device 710 is granted access, a transaction message may be generated by the access device 720 to proceed with a payment associated with the granted access. In some embodiments, the transaction message generated by the access device 720 may contain any suitable data such as any suitable portion of the sensitive data with which access was granted. By way of example, the transaction message may include the track 2 data indicated in the code generated by the user device 710 and obtained by the access device 720. The transaction message may further indicate an amount corresponding to the granted access (e.g., a payment price).

The resource provider computer 730 may receive this information from the access device 720 via an external communication interface. The resource provider computer 730 may then generate an authorization request message that includes at least a portion of the information received from the access device 720 and electronically transmits this message to a transport computer 410. The transport computer 740 may then receive, process, and forward the authorization request message to a processing network computer 750 for authorization.

In general, prior to the occurrence of a credit or debit-card transaction, the processing network computer 750 has an established protocol with each issuer on how the issuer's transactions are to be authorized. In some cases, such as when the transaction amount is below a threshold value, the processing network computer 750 may be configured to authorize the transaction based on information that it has about the user's account without generating and transmitting an authorization request message to the authorizing entity computer 760. In other cases, such as when the transaction amount is above a threshold value, the processing network computer 750 may receive the authorization request message, determine the issuer associated with the user device 710, and forward the authorization request message for the transaction to the authorizing entity computer 760 for verification and authorization. Once the transaction is authorized, the authorizing entity computer 760 may generate an authorization response message (that may include an authorization code indicating the transaction is approved or declined) and transmit this electronic message via its external communication interface to processing network computer 750. The processing network computer 750 may then forward the authorization response message to the transport computer 740, which in turn may then transmit the electronic message to comprising the authorization indication to the resource provider computer 730, and then to the access device 720.

At the end of the day or at some other suitable time interval, a clearing and settlement process between the resource provider computer 730, the transport computer 740, the processing network computer 750, and/or the authorizing entity computer 760 may be performed on the transaction.

Figure 8:
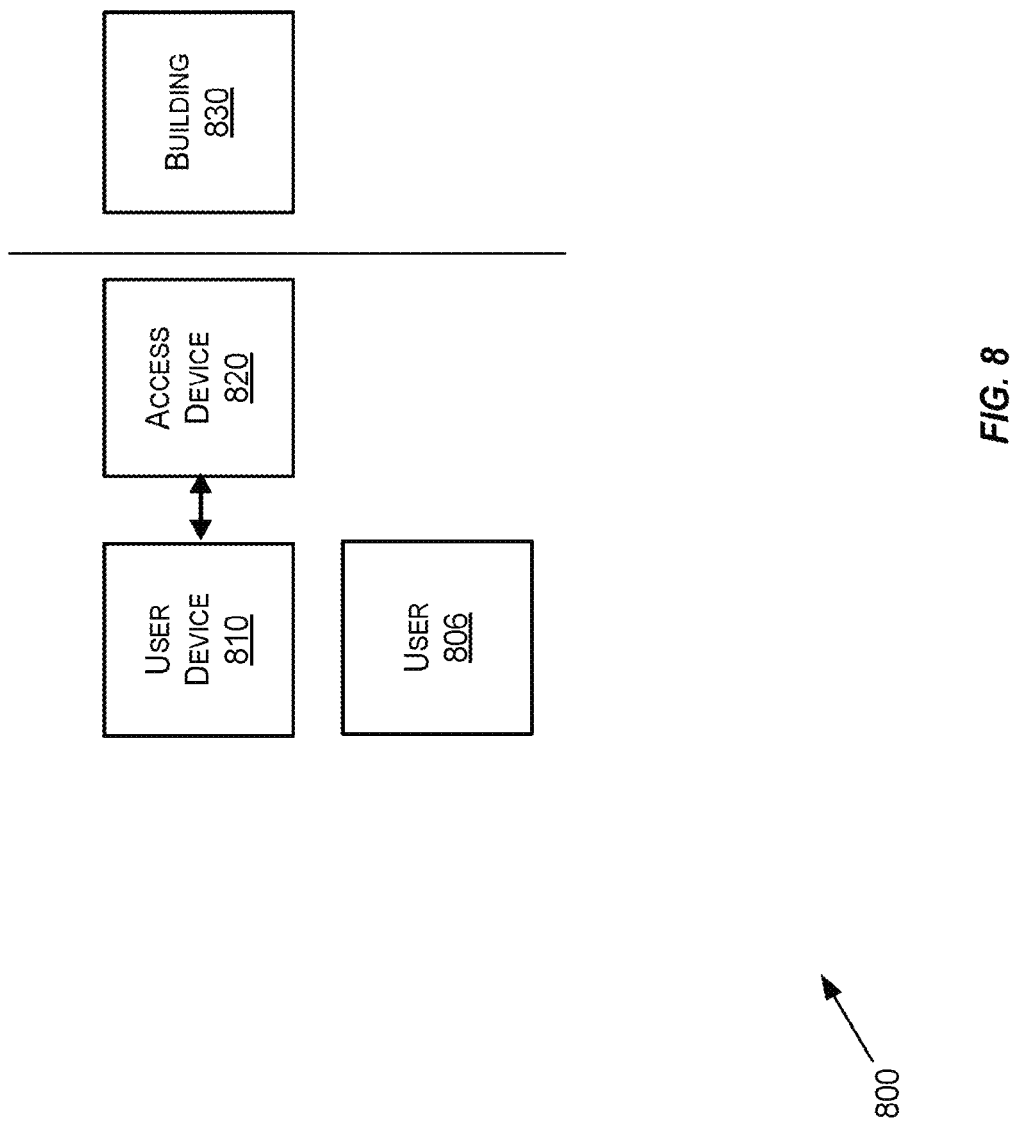
FIG. 8 shows a block diagram illustrating a building access system.

FIG. 8 shows a block diagram of a building access system 800. FIG. 8 shows a user device 810 (e.g., user device 102 of FIG. 1) operated by a user 806 (e.g., the user 103 of FIG.

1). The user device 810 can interact with the access device 820 (e.g., an example of the access device 118 of the above figures) and pass sensitive data in the form of a code (e.g., a visual and/or audio code) as described above in connection with method 400 of FIG. 4. The access device 820 may be configured to obtain the sensitive data from the user device 810 via a microphone, a scanner, an imaging device, or the like. The access device 820 may extract the sensitive data by converting the code in the manner described above. The sensitive data may include a digital certificate associated with the user device 810 and certified by a certificate authority, the identity of which may be indicated in the sensitive data (e.g., via a CA public key index). By retrieving and utilizing the public key associated with the certificate authority and stored in local memory at the access device 820, the access device 820 may retrieve the public key associated with the user device 810 from the digital certificate included in the sensitive data. The public key associated with the user device 810 may be utilized to determine whether the sensitive data is valid (e.g., is unaltered). For example, a digital signature value generated by the user device 810 and included in the sensitive data may be extracted utilizing the public key associated with the user device 810 and a cryptographic algorithm (e.g., an elliptic curve cryptographic algorithm). A number of predetermined data fields of the sensitive data may be hashed, and that hash value may be compared to the extracted digital signature value. If the values match, the access device 820 may be configured to determine that the sensitive data is valid (e.g., unaltered). If the values do not match, the access device 820 may be configured to determine that the sensitive data is invalid (e.g., altered). If the data is invalid, the access device 820 may deny access to the building 830. If the data is valid, the access device 820 may grant access to the building 830 or perform further processing.

In some embodiments, even if the data is determined to be valid, the access device 820 may be configured to perform additional processing. For example, timestamp data of the sensitive data may be utilized to determine a date and/or time at which the code containing the sensitive data was generated by the user device 810. If the date and/or time of the code generation is greater than a predetermined period of time prior to a current time, the access device 820 may deny access to the building 830. If the data and/or time of the code generation is which the predetermined period of time prior to the current time, the access device 820 may grant access to the building 830 or conduct further processing. For example, in lieu of the timing processing, or in addition to the timing processing described above, the access device 820 may be configured to check an identifier included in the sensitive data against a list of restricted identifiers. The list of restricted identifiers may include all identifiers for which access is to be denied. In some embodiments, if the access device 820 determines that the identifier included in the sensitive data is not included in the list of restricted identifiers, the access device 820 may grant access to the building 830. If however, the identifier included in the sensitive data is also included in the list of restricted identifiers, the access device 820 may deny the user 806 access to the building 830.

TECHNICAL IMPROVEMENTS

By utilizing the techniques described herein, a more secure manner for communicating sensitive data is enabled. The sensitive data may be embedded in a visual and/or audio code to shield such data from the eyes and ears of fraudsters. Additionally, the sensitive data is communicated through a reader and/or a microphone of the receiving device directly, reducing the chance that the data may be intercepted and potentially altered or stolen. Through utilization of the techniques described here, the overall data footprint of the sensitive data may be reduced while still obtaining the same degree of security with respect to conventional techniques. Through communication of this data, a method for offline authentication is enabled that allows for a user to be authenticated at the receiving device in a minimal amount of time and without obtaining any additional data from a server regarding the user and/or user device.

Any of the computing devices described herein may be an example of a computer system that may be used to implement any of the entities or components described above. The subsystems of such a computer system may be are interconnected via a system bus. Additional subsystems include a printer, keyboard, storage device, and monitor, which is coupled to display adapter. Peripherals and input/output (I/O) devices, which couple to I/O controller, can be connected to the computer system by any number of means known in the art, such as a serial port. For example, I/O port or external interface can be used to connect the computer apparatus to a wide area network such as the Internet, a mouse input device, or a scanner. The interconnection via system bus may allow the central processor to communicate with each subsystem and to control the execution of instructions from system memory or the storage device, as well as the exchange of information between subsystems. The system memory and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer-implemented method performed by a user device for offline authentication, the method comprising:
   obtaining, by the user device, interaction data;
   generating, by the user device, a digital signature based on portions of the interaction data;
   generating, by the user device, a code based on the interaction data and the digital signature, the code comprising a digital certificate certified by a server, and an index associated with the server;
   providing, by the user device, the code to an access device, wherein the access device operates in an offline mode and is configured to:
   (i) process the code to obtain the interaction data,
   (ii) obtain, from a local storage, a first public key of the server based on the index,
   (iii) obtain a second public key of the user device based on the first public key and the digital certificate,
   (iv) determine validity of the interaction data based on the digital signature and the second public key of the user device,
   (v) responsive to the interaction data being determined to be valid, determine whether a first identifier associated with the interaction data satisfies a first condition related to a time instance at which the first identifier of the interaction data is generated, and
   (vi) responsive to the first identifier satisfying the first condition, verify whether a second identifier of the user device satisfies a second condition, the second condition corresponding to determining whether the second identifier of the user device is a restricted identifier; and
   receiving, by the user device, access to a resource based on the first condition and the second condition being satisfied.

2. The computer-implemented method of claim 1, wherein the code is in form of a quick response (QR) code that is presented to the access device via a display of the user device.

3. The computer-implemented method of claim 1, wherein the code is in form of a sound presented to the access device via a speaker of the user device.

4. The computer-implemented method of claim 1, wherein the digital certificate is certified by the server within a threshold time period prior to the user device providing the code to the access device.

5. The computer-implemented method of claim 1, wherein the user device generates the digital signature in accordance with an elliptic curve cryptographic algorithm.

6. The computer-implemented method of claim 1, wherein the interaction data includes a timestamp data field corresponding to a time instant the code was generated, and wherein the user device receives access to the resource based on the time instant being within a threshold amount of time with respect to a current time.

7. The computer-implemented method of claim 1, wherein the digital signature is generated utilizing an elliptical curve cryptography algorithm, a private key of the user device, and at least one timestamp data field, a public key index data field, and a public key certificate of the interaction data.

8. The computer-implemented method of claim 1, wherein the user device is one of a cellular phone, a personal digital assistant, a net book, a smart watch, or a pager.

9. The computer-implemented method of claim 1, further comprising:
   receiving, by the user device, a message from the access device, the message indicating completion of an interaction performed by the access device.

10. A user device, comprising:
    one or more processors; and
    one or more memories storing computer-executable instructions, which when executed by the one or more processors, causes the user device to:
    obtain interaction data;
    generate a digital signature based on portions of the interaction data;
    generate a code based on the interaction data and the digital signature, the code comprising a digital certificate certified by a server, and an index associated with the server;
    provide the code to an access device, wherein the access device operates in an offline mode and is configured to:
    (i) process the code to obtain the interaction data,
    (ii) obtain, from a local storage, a first public key of the server based on the index,
    (iii) obtain a second public key of the user device based on the first public key and the digital certificate,
    (iv) determine validity of the interaction data based on the digital signature and the second public key of the user device,
    (v) responsive to the interaction data being determined to be valid, determine whether a first identifier associated with the interaction data satisfies a first condition related to a time instance at which the first identifier of the interaction data is generated, and
    (vi) responsive to the first identifier satisfying the first condition, verify whether a second identifier of the user device satisfies a second condition, the second condition corresponding to determining whether the second identifier of the user device is a restricted identifier; and
    receive access to a resource based on the first condition and the second condition being satisfied.

11. The user device of claim 10, wherein the code is in form of a quick response (QR) code that is presented to the access device via a display of the user device.

12. The user device of claim 10, wherein the code is in form of a sound presented to the access device via a speaker of the user device.

13. The user device of claim 10, wherein the digital certificate is certified by the server within a threshold time period prior to the user device providing the code to the access device.

14. The user device of claim 10, wherein the digital signature is generated in accordance with an elliptic curve cryptographic algorithm.

15. The user device of claim 10, wherein the interaction data includes a timestamp data field corresponding to a time instant the code was generated, and wherein the user device receives access to the resource based on the time instant being within a threshold amount of time with respect to a current time.

16. The user device of claim 10, wherein the digital signature is generated utilizing an elliptical curve cryptography algorithm, a private key of the user device, and at least one timestamp data field, a public key index data field, and a public key certificate of the interaction data.

17. The user device of claim 10, wherein the user device is one of a cellular phone, a personal digital assistant, a net book, a smart watch, or a pager.

18. The user device of claim 10, wherein the user device receives a message from the access device indicating completion of an interaction performed by the access device.

* * * * *